DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED MAY 4, 1976

946 O.G. 10

T946,012
GAS COMPRESSOR VALVE ARRANGEMENT WITH IMPROVED WEAR RESISTANCE

Leonard L. Willis, Minneapolis, Minn., assignor to Thermo King Corporation, Minneapolis, Minn.

Continuation of abandoned application Ser. No. 469,589, May 13, 1974. This application May 7, 1975, Ser. No. 575,291

Int. Cl. F04b *39/10*
U.S. Cl. 417—550
1 Sheet Drawing. 6 Pages Specification

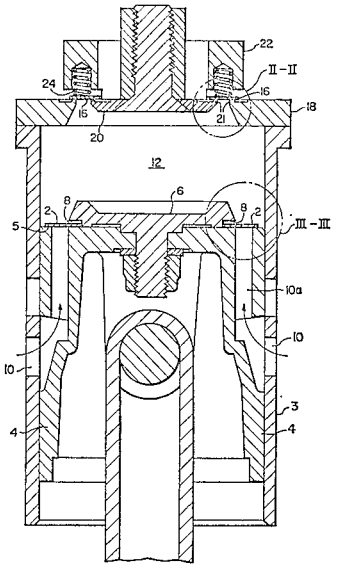

This invention relates to improving the active life and wear resistance of suction and exhaust valves used in the gas compressor for a refrigerator system. To reduce excessive valve wear caused by either dynamic impact of opposing valve surfaces or from the corrosive nature of the compressed fluid and to eliminate valve chatter, the valve seat, all the surfaces of the valve, and the valve stop are coated with an anti-friction, resilient Teflon material. By providing a Teflon to Teflon surface rather than a metal to metal or metal to Teflon surface, the energy from the valve impact at its stop or seat can be partially absorbed to thereby substantially decrease rebound from the stops and reduce wear due to both impact and friction so as to increase the life of the valve over that of conventional valve assemblies.

May 4, 1976
L. L. WILLIS
T946,012
GAS COMPRESSOR VALVE
ARRANGEMENT WITH IMPROVED WEAR
RESISTANCE
Original Filed May 7, 1975
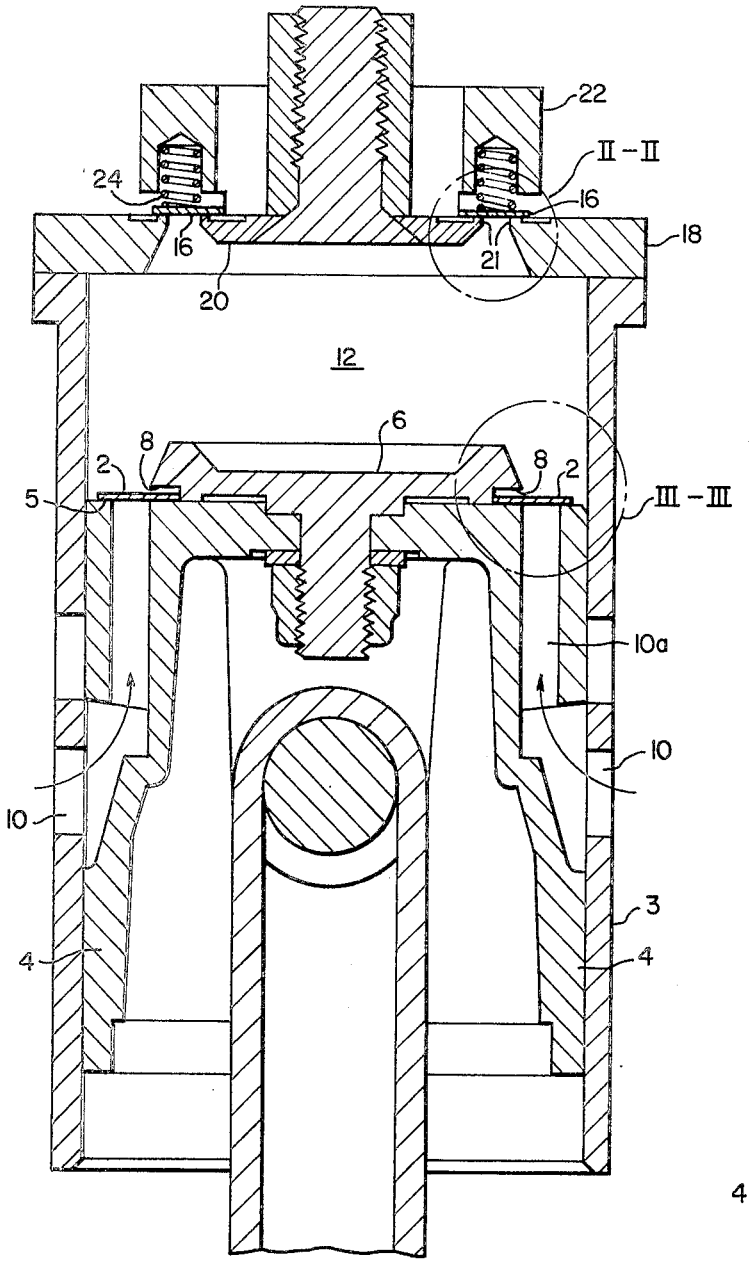
FIG. 1.
FIG. 2.
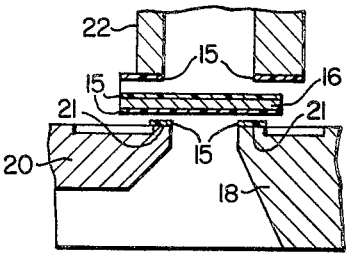
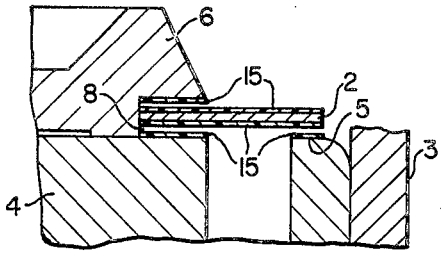
FIG. 3.